United States Patent
Goudal

(10) Patent No.: US 6,976,453 B2
(45) Date of Patent: Dec. 20, 2005

(54) ERGONOMIC AND ADJUSTABLE VETERINARY APPARATUS FOR MOVEMENT RESTRICTION

(76) Inventor: Emmanuel Goudal, Chemin Cour Perron, 14250 Tilly sur Seulles (FR)

(*) Notice: Subject to any disclaimer, the term of this patent is extended or adjusted under 35 U.S.C. 154(b) by 0 days.

(21) Appl. No.: 10/297,924

(22) PCT Filed: Jun. 15, 2001

(86) PCT No.: PCT/FR01/01871

§ 371 (c)(1),
(2), (4) Date: Jun. 10, 2003

(87) PCT Pub. No.: WO01/97711

PCT Pub. Date: Dec. 27, 2001

(65) Prior Publication Data
US 2004/0045512 A1    Mar. 11, 2004

(30) Foreign Application Priority Data

Jun. 19, 2000 (FR) ................................. 00 08173
Jun. 14, 2001 (FR) ................................. 01 07844

(51) Int. Cl.[7] .......................... A01K 15/04; A61F 5/00
(52) U.S. Cl. ................ 119/815; 119/814; 119/760; 119/761; 119/712; 602/19; 602/18; 602/6; 602/36; 128/845; 2/44; 2/92
(58) Field of Search .................... 119/815, 712, 719, 119/760, 761, 766, 850, 856, 907, 729, 814, 119/725, 727, 728; 54/19.1, 20; 450/96; 2/44, 92; 602/19, 6, 18, 36; 606/201, 240, 606/238; 128/845; 600/9

(56) References Cited

U.S. PATENT DOCUMENTS

| | | | | |
|---|---|---|---|---|
| 764,876 A | * | 7/1904 | Alexander | 119/818 |
| 845,558 A | * | 2/1907 | Lee | 54/1 |
| 1,085,954 A | * | 2/1914 | Townsend | 119/712 |
| 1,747,702 A | * | 2/1930 | Gilbert | 119/814 |
| 2,826,172 A | * | 3/1958 | Buckle et al. | 119/792 |
| 4,103,645 A | * | 8/1978 | Tyler | 119/868 |
| 4,286,547 A | * | 9/1981 | Nuwbauer et al. | 119/815 |
| 4,329,942 A | * | 5/1982 | King | 119/814 |
| 4,385,592 A | * | 5/1983 | Goldstein | 602/18 |
| 4,559,906 A | * | 12/1985 | Smith | 119/865 |
| 5,099,800 A | * | 3/1992 | Fitzpatrick et al. | 119/719 |
| 5,109,803 A | * | 5/1992 | Dunham et al. | 119/654 |

(Continued)

FOREIGN PATENT DOCUMENTS

| | | | | | |
|---|---|---|---|---|---|
| DE | 3319053 A1 | * | 11/1984 | | A41D 13/00 |
| DE | 4000702 A1 | * | 7/1991 | | A01K 23/00 |
| FR | 2480109 A | * | 4/1980 | | A61D 9/00 |
| FR | 2769796 A | * | 4/1999 | | A01K 13/00 |

Primary Examiner—Peter M. Poon
Assistant Examiner—Andrea M. Valenti
(74) Attorney, Agent, or Firm—Westerman, Hattori, Daniels & Adrian, LLP

(57) ABSTRACT

The invention concerns a movement restricting apparatus designed to prevent an animal from reaching with its mouth or some of its limbs, a zone of its body to be protected. The apparatus comprises features for fixing the apparatus to the animal and for restricting movement being attached or linked to each other. A dorsal slide on the feature for restricting movement is designed to be placed perpendicular to the animal's saggital symmetry, against the top of a part of its spine, and is in the form of a profiled section with open or closed cross-section.

37 Claims, 7 Drawing Sheets

U.S. PATENT DOCUMENTS 5,775,970 A * 7/1998 Klees et al. ................. 446/297
5,843,009 A * 12/1998 Stojanovic ................... 602/19
5,896,831 A * 4/1999 Alpert ......................... 119/856
5,924,388 A * 7/1999 Peeples ....................... 119/814
6,101,979 A * 8/2000 Wilson et al. .............. 119/725
6,267,083 B1 * 7/2001 Chimienti ................... 119/850

* cited by examiner

ERGONOMIC AND ADJUSTABLE VETERINARY APPARATUS FOR MOVEMENT RESTRICTION

The invention concerns, in a general way, a veterinary outfit designed for animals, in particular for domestic quadrupeds.

More specifically, the invention relates to an apparatus for movement restriction designed to prevent an animal from reaching with its mouth or some of its limbs at least a zone of its body to be protected. Typically, each zone of the animal's body to be protected comprises at least a lesion such as a scar and/or a treatment device such as a bandage or a perfusion needle. It is known that an animal that is, for example, injured, has a tendency to lick and/or scratch this zone with its hind paws.

Before touching on the invention, let us cite some documents relating to the field of veterinary outfits for movement restriction, in chronological filing order.

Document U.S. Pat. No. 3,036,554 describes a device for protection against auto-mutilation. It is in the shape of a truncated cone, positioned around the neck of an animal and extended forward. This device has the disadvantage of being uncomfortable and of interfering with the animal's actions such as eating or sleeping.

Document U.S. Pat. No. 4,286,547 describes a restriction unit for animals. A collar and an abdominal band are connected by lateral pieces, adjustable to properly fit the animal, in such a way that the unit prohibits the lateral twisting of the animal. Rapid fixation means are provided, made of notched connectors able to fit into slots, after their elastic deformation.

Document FR-A-2,480,109 describes a veterinary apparatus meant to ensure orthopedic correction of the hind limbs in the case of hip dysplasia of an animal. A harness rests on the lumbar region and the back of the animal by means of rigidity plates. These plates are curved in such a way as take the exact shape of the animal's external anatomy. A belly-band strap tightly belted under the thorax ensures the fixation of the plate by applying it to the back with a directional precision. A metallic stirrup piece on the rump and the lumbar region is connected to a flat iron by an axle that can pivot, which allows the movement of the rear part of the body.

Document U.S. Pat. No. 4,385,592 describes a cervical strapping arrangement to immobilize the neck as well as the thoracic and lumbar regions of a dog following a surgical operation. A plurality of rigid metal bands secured in housings imparts longitudinal straightness to the animal, while allowing relative lateral flexibility. This strapping arrangement includes a covering body element, with a narrowed part under the ventral side, fixed at its ends by detachable micro-gripper or Velcro® closures.

Document U.S. Pat. No. 4,489,676 describes a cervical canine jacket made of fabric with a pair of openings for the front limbs to go through. A body made of synthetic material offers a rigidity sufficient to prevent the dog from bending. Rigidification elements made of synthetic material are arranged along the vertebral column.

Document U.S. Pat. No. 4,799,458 describes a restrictive collar for an animal. A rigid framework is placed around the head of the animal, and possesses longitudinal adjustment slides.

Document FR-A-2,628,290 describes a fetter of conical shape to be fastened to the neck of an animal by a collar with straps.

Document WO-A-92/02,128 describes a safety system for the transport of an animal, possessing rapid-release fixation elements. This system is designed for attachment to a safety belt of an automobile.

Document WO-A-99/11,494 describes a safety harness to fix an animal to a safety belt of an automobile.

Finally, document FR-A-2,769,796 describes a device for preventing auto-mutilation in quadruped animals. A collar surrounds the neck of the animal while a belt surrounds its lumbar circle.

In spite of their number, known solutions to the problem of the restriction of an animal's movements do not presently provide complete satisfaction. It is, however, increasingly common to provide treatment to animals. And therefore to have to oppose this tendency of animals to lick and/or scratch themselves.

Thus apparatuses in the shape of a yoke or a funnel placed around the neck of the animal have the particular disadvantages of:

limiting the visual field of the animal in a bothersome way;

being encumbering for the animal, which has a tendency to collide with its environment;

posing hygiene problems, because of the dirtying of the apparatus in particular against the ground in proximity to which it is positioned.

In many cases, apparatuses such as those described in document FR-A-2,769,796 provide satisfaction. But nevertheless they present certain disadvantages of a technical order. For example, this type of apparatus does not always make it possible to respond to the antagonistic imperatives that are imposed on it.

On the one hand, the structure of the apparatus must resist and oppose the torsion forces applied by the animal, without excessive deformation.

On the other hand, it is desirable that this same structure be able to take the shape as perfectly and comfortably as possible of the varied morphology of different animals. Particularly according to the size of the animal, the longitudinal dimension varies greatly: in fact, an apparatus well-shaped for a given animal—for example of small size—is not suitable in certain cases for another animal—of more imposing size.

Other antagonistic constraints also know no optimal answer, such as those of the structural rigidity that stands in the way of outfits often felt as excessively weighty and covering by the animal.

Moreover, in order for the apparatus to completely fulfill its restriction function, it must not be able to undergo rotational displacement around the longitudinal direction of the animal.

Conversely, it is desirable that the structure of the apparatus remain arranged on the animal at a chosen and precise position. In particular it is appropriate that the apparatus not interfere with its front shoulders.

In practice, it is sometimes desirable that restriction outfits be able to offer a greater ease of placement on—or removal from—the animal.

There is therefore a presently unsatisfied demand for an apparatus that is relatively universal with respect to the varied morphology of the animals upon which it can be placed, even while making possible an excellent restriction or immobilization of the animal and while preserving its comfort as much as possible.

The invention aims to palliate these disadvantages in particular.

To this end, an object of the invention is a movement restriction apparatus designed to prevent an animal from reaching with its mouth or some of its limbs a zone of its body to be protected.

This apparatus is of a type comprising: anterior means for securing the apparatus to the animal; posterior means for securing the apparatus to the animal; movement restriction means, such as at least a piece made of rigid material; the anterior and posterior securing means being integral or connected to the movement restriction means.

A characteristic of the invention provides that the movement restriction means comprise a dorsal rail designed to be placed at right angles to the sagittal symmetry plane of the animal, against the crest of a part of its vertebral column, this rail being in the form of a section with a closed or open transverse cross-section.

According to one embodiment, the dorsal rail comprises at least one longitudinal section, with a central arch having a concavity turned toward the bottom and two falling wings, essentially symmetrically from top to bottom and from the inside to the outside. For example, the arch and the two wings of the rail are made of one piece of material.

In an embodiment, the central arch forms a projecting groove of rigidity, ventilation and comfort, while the two wings form zones of lateral support on the back of the animal; for example, the lateral wings and/or the central arch are at least in part covered—in particular on the inside—with a soft comfort covering such as a cushion of washable hypoallergenic foam.

An embodiment of the invention provides that at least one rail section of the restriction means is made preferentially of plastic, for example formed by injection, or of metal such as aluminum or stainless steel, for example obtained by rolling of flat rolled metal.

According to another embodiment, the rail section comprises a series of divisible sections delimited by peripheral sectioning lines accompanied by lower pre-fractures, each section enclosing, in proximity to each sectioning line, an embedded resistive conductor from which two electrodes emerge.

In another embodiment, this rail comprises at least two sections, the one male and the other female, of general transverse cross-section in the shape of an omega or a Gaussian curve, fitted into each other by a longitudinal sliding motion, and relative immobilization means of the two sections, to form telescopic longitudinal adjustment means for the outfit.

According to one embodiment, the dorsal rail comprises at least two slits opposite each other transversally, and of essentially longitudinal general orientation, these slits being part of the binding means between the means for securing and for restriction and/or, optionally, of the relative immobilization means of the two adjustable telescopic sections in the longitudinal direction of the apparatus.

In an embodiment, the dorsal rail comprises at least a fixation means or at least two orifices opposite each other transversally, and being part of the means for supporting on the apparatus at least a device for treatment or analogous devices, such as a perfusion device and/or an electronic device for example for measurement.

According to another characteristic, the dorsal rail section is phosphorescent, each of its surfaces serves as a support for advertising material carried by the animal.

According to another characteristic, the dorsal rail is equipped at its front portion with at least two detachable antennae equipped with an acoustic alarm, such as small bells. This means enables a blind animal to avoid bumping its head on an obstacle and fulfills the function of a blind man's cane.

A characteristic of the invention provides that the anterior means for securing the apparatus to the animal comprise at least a strap designed to be crossed under the sternum of the animal, for example, this strap being connected to the restriction means via its passage through at least one slit of the binding means between the securing and restriction means.

In an embodiment, the anterior and/or posterior means for securing the apparatus to the animal comprise one or several straps, at least two ends and/or parts of which are arranged to be connected, by a rapid fixation equipped with at least an elastically deformable connector capable of fitting into a slot of essentially complementary shape after elastic deformation.

Another characteristic of the invention provides that the posterior means for securing the apparatus to the animal comprise a circle designed to encompass the lumbar girdle of the animal, for example, this posterior circle is semi-rigid.

In an embodiment, the posterior lumbar circle is at least in part made of material allowing a slight elastic deformation, such as semi-flexible synthetic material; at least an upper third to two-thirds of this circle is made of such a rigid material, while at least a lower third to two-thirds comprises a material allowing a slight elastic deformation and/or an opening-closing articulation of this circle.

In another embodiment, the lumbar circle is included in synthetic-fabric breeches that are more or less covering.

In an embodiment, the anterior and/or posterior means for securing the apparatus to the animal comprise at least a pair of micro-gripper closures, respectively male and female, on at least two ends and/or parts, which also make possible the fixation of medical devices.

The description that follows and which refers to the appended drawings, makes it possible to understand the invention, as put into practice by way of example.

The invention that relates to an outfit or apparatus 1 is now described by referring to three principal directions relative to an animal 2.

Figure 1:
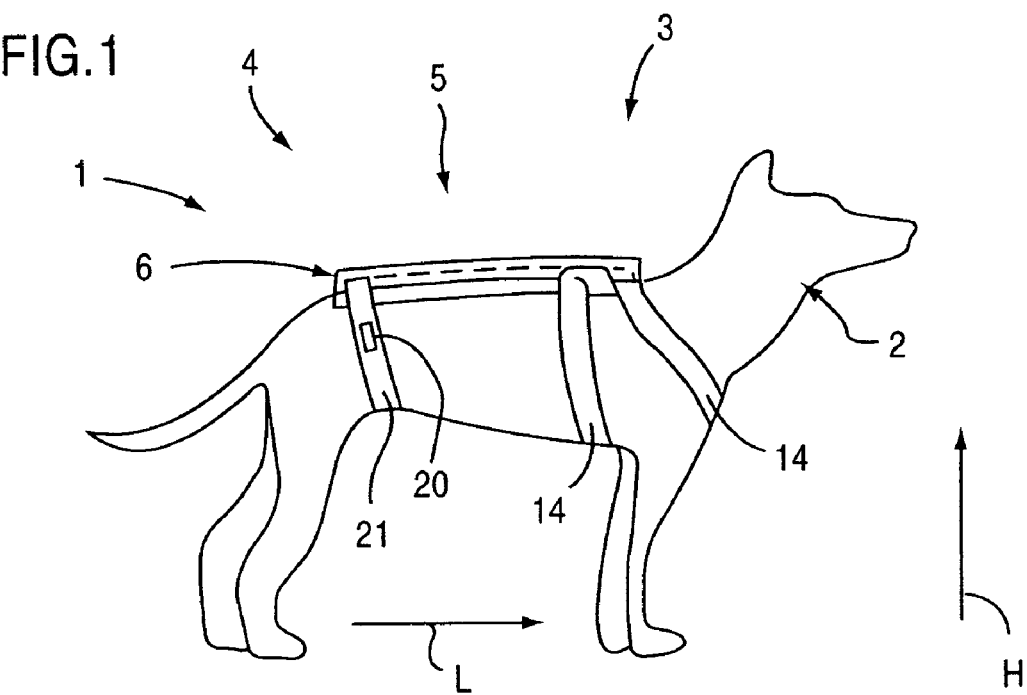
FIG. 1 is a longitudinal view from the side of an apparatus according to an embodiment of the invention, worn by an animal shown schematically for the sole purpose of comprehension of the invention.

The longitudinal direction L corresponds to the general orientation of the vertebral column of the animal 2, which is horizontal in FIG. 1.

Figure 2:
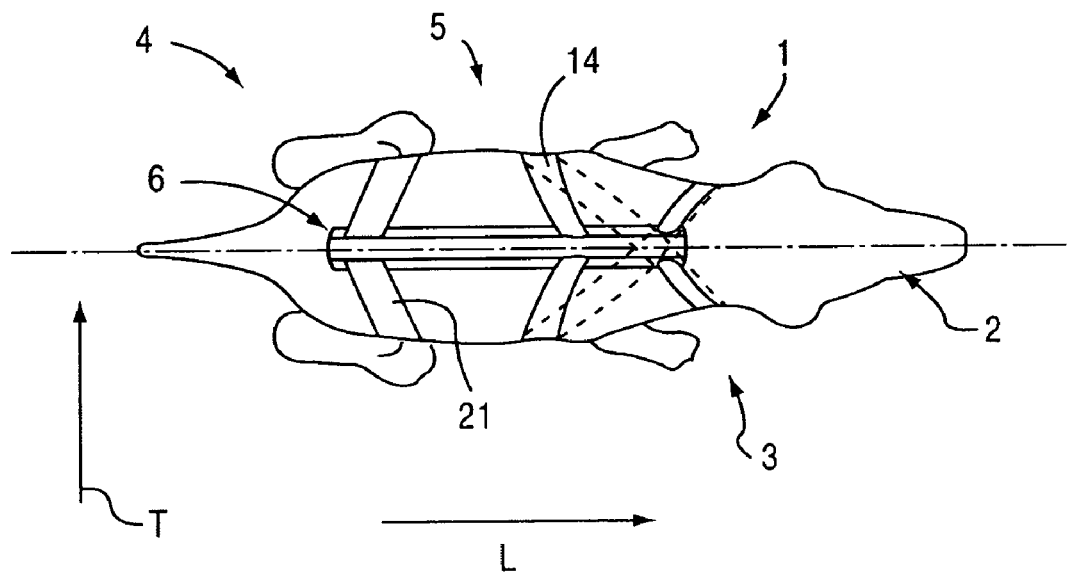
FIG. 2 is a view in the longitudinal and transverse plane of the outfit of FIG. 1 from above, the animal wearing it also being here shown only to facilitate comprehension of the invention.

"Transverse" refers to a direction T perpendicular to the longitudinal direction L, which forms with the latter a plane LT corresponding to the general plane of the paper in FIG. 2. This direction T, also considered horizontal, defines the lateral or side localizations of the apparatus 1 as well as the animal 2.

A third direction H, perpendicular to the plan formed by the directions L and T, is called "elevation" or "height". In the figures it is considered as being vertical. It is in the plane of the paper in FIG. 3, just as is the transverse direction T. Together the directions L and H form a plane LH of approximately sagittal symmetry of the animal 2. Together the directions H and T form a plane HT, referred to as transverse, of the apparatus 1.

Among the numerous embodiments of the invention that are provided for, FIGS. 1 and 2 show an apparatus 1 put in position on the spine of a quadruped animal 2. The apparatus 1 is designed to prevent this animal 2 from reaching, with its mouth or some of its limbs, a zone (not shown) of its body to be protected.

The apparatus 1 is of the type comprising principally:
anterior means 3 for securing the apparatus 1 to the animal;
means 4 that provide the posterior securing of the apparatus 1; and
means 5 that have as their function the movement restriction strictly said.

The means 5 have according to the invention the form of at least a piece 6 or rail made of rigid material. The securing means 3 and 4 are integral—i.e. attached—to the means 5, and therefore to the piece 6.

In the figures this piece for movement restriction forms a rail also shown in 6. The rail 6 is referred to as dorsal, because it is designed to be placed at right angles to the sagittal symmetry plane LH of the animal 2, against the crest of a part of its vertebral column.

Figure 3:
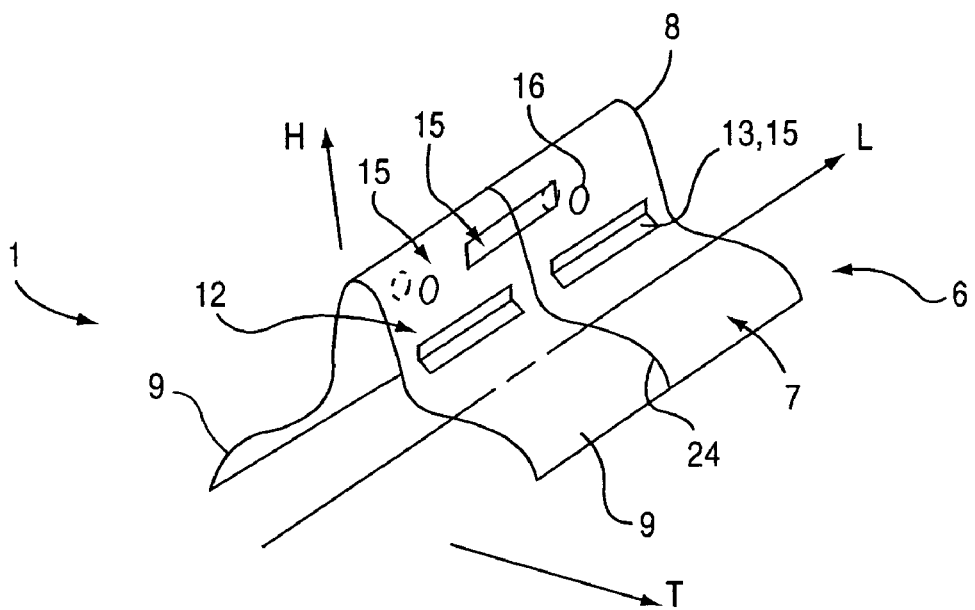
FIGS. 3 and 4 show a partial schematic perspective transverse view that illustrates an embodiment of the dorsal rail section according to the invention, equipped with longitudinal slits and with orifices.
Figure 4:
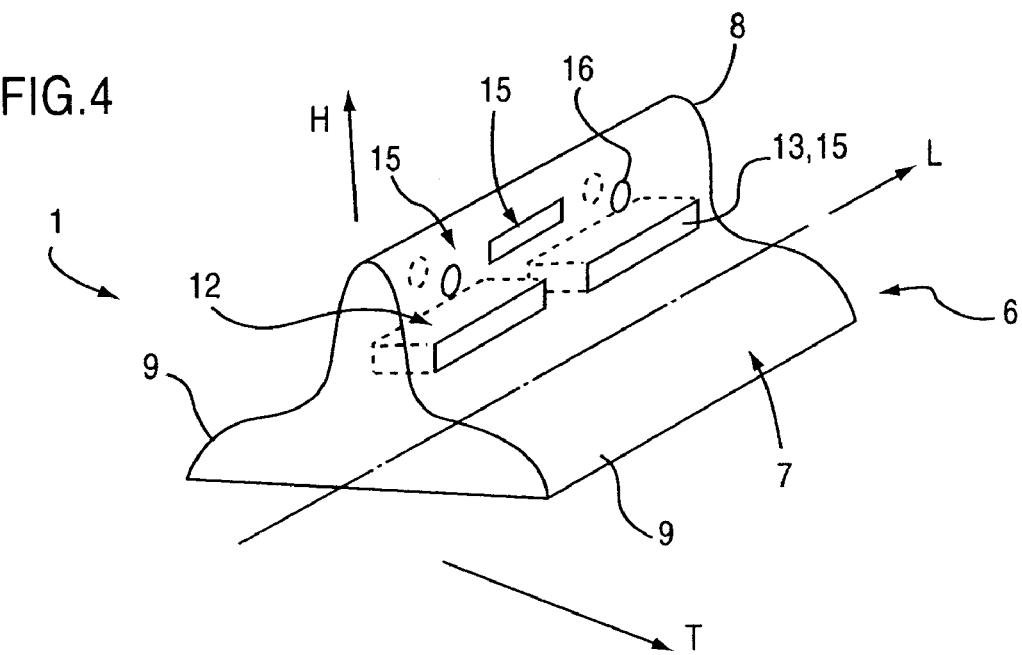

It is clearly shown in FIGS. 3 and 4 that the rail 6 is in the form of a section of closed or open transverse cross-section.

Viewing the rail 6, it is seen that it comprises a longitudinal section 7 with a general transverse cross-section in the shape of an omega or a Gaussian curve. Put in a different way, this rail 6 possesses (essentially symmetrically from top to bottom and from the inside to the outside) a central arch 8 with a concavity turned toward the bottom and two falling wings 9. The central arch 8 forms a projecting groove of rigidity, ventilation and comfort. As to the two wings 9, they form zones of lateral support on the back of the animal 2. In the example shown in FIG. 5, the lateral wings 9 (and the central arch 8 as well) are covered oil the inside with a soft covering or comfort cushion 10, made of washable hypoallergenic foam. Here, the arch 8 and the two wings 9 of the rail 6 are made of one piece of material.

In the embodiments illustrated, the rail section 6 is preferentially made of plastic formed, for example, by injection. It may also be made of metal (aluminum, stainless steel, etc.) obtained by rolling of flat rolled metal.

In other embodiments, it is made of synthetic material or metal, formed by extrusion for example. Some embodiments provide that the rail 6 possesses an interior metal rib, embedded in a body of synthetic material incorporating the cushion 10.

It is to be noted here that the embodiment in or with metal makes it possible that the rail(s) 6 may be bent to the desired shape. That is to say, once the length of the rail is correctly adjusted to the profile of the vertebral column of the animal 2, one or more plastic deformations or curves are imparted to it. Thus the profile of the rail 6 follows as perfectly and therefore as comfortably as possible that of the vertebral column of the animal 2, on which it (6) rests.

Figure 5:
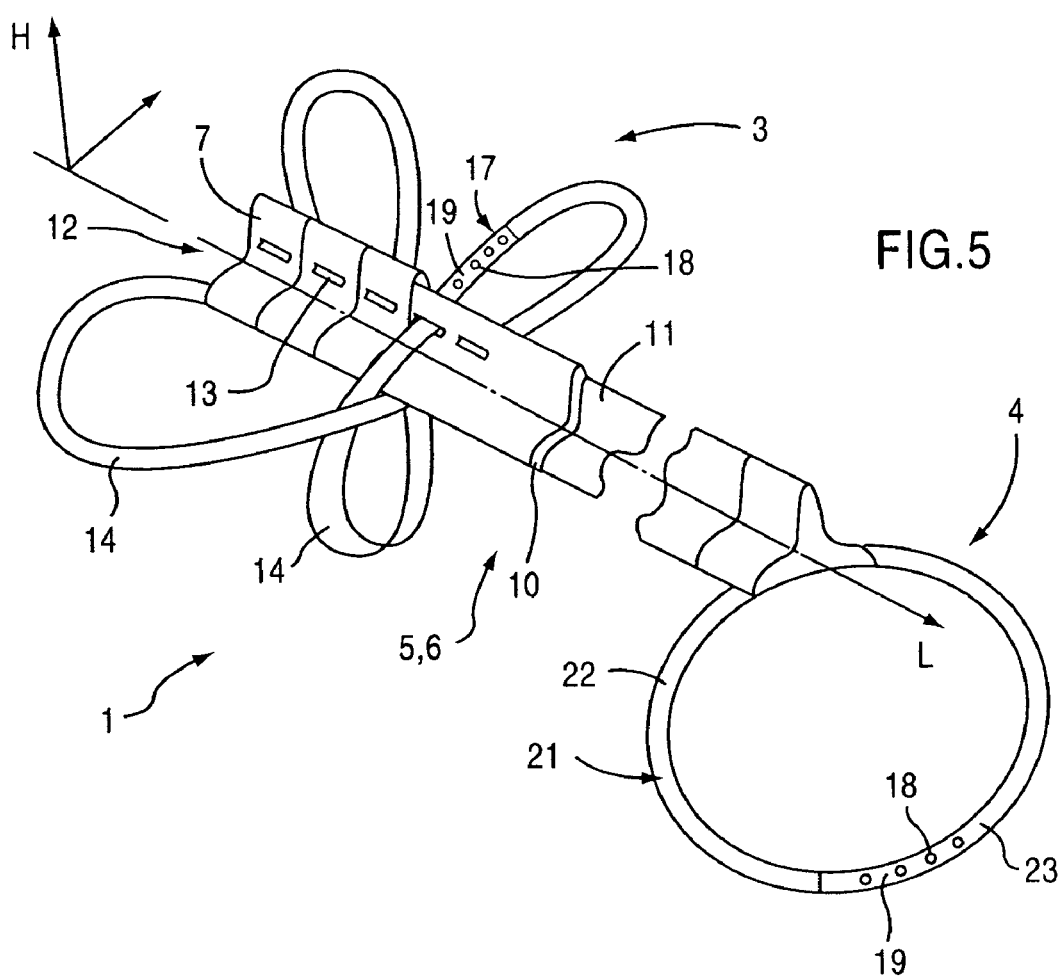
FIG. 5 is a partial schematic perspective transverse view from above that illustrates another embodiment of the apparatus according to the invention.

In FIG. 5 the rail 6 comprises two sections, one 11 referred to as male, the other 7 referred to as female. These sections 7 and 11 are fitted one (11) into the other (7) by a sliding motion in the longitudinal direction L. These two sections 7 and 11 have complementary transverse cross-sections. The female section 7 is contrived to receive, through a sliding motion into the cavity that the former delimits, the male section 11, which has a transverse cross-section smaller but complementary to that of the female section 7. The dorsal rail 6 thus forms a telescopic arrangement, which makes possible an easy longitudinal adjustment of the apparatus 1 as a function of the size of the animal 2 for which it is intended.

Relative immobilization means 12 of the male 11 and female 7 sections lock them in the longitudinal direction L when they give to the rail 6 the dimension that best fits the animal 2 for which the apparatus 1 is intended. Thus a telescopic adjustment structure for the apparatus 1 is obtained, formed by the sections 7 and 11 and the means 12.

Slits 13 are arranged two by two opposite each other transversally, and with a general orientation that is essentially longitudinal. In the figures, these slits 13 are arranged at regular intervals along the longitudinal direction L, on both sides of the arch 8 of the sections of the rail 6.

These slits 13 have several functions.

In FIG. 5, they are part of the immobilization means 12 of the sections 7 and 11. As a matter of fact, two slits 13, referred to as internal, of the male section 11 are placed respectively opposite to a pair of external slits 13 of the female section 7.

An anterior strap 14 is passed transversally through the two external and internal slits of first one side then the other side of the arch 8 of the rail 6. The dimensions of the strap 14 make possible its passage by sliding motion with reduced clearance through these slits 13. And the material of the strap 14 is chosen so that it forms a stop capable of opposing the tendencies of sections 7 and 11 to being displaced relatively to each other longitudinally.

These same slits 13 also ensure a ventilation function of the rail 6, and, if necessary, they can be employed as support means 15 on the apparatus 1 of one (or several) treatment devices or analogous devices, such as a perfusion device or an electronic device of, for example, measurement. Such is also the function, in FIG. 3, of a means of fixation or orifices 16 arranged opposite each other transversally above each slit 13 of the rail 6.

Another function of the slits 13 is connected to the fact that the anterior strap 14, designed to be crossed under the sternum of the animal 2, acts as anterior securing means 3. To this end, the strap 14 connected as shown higher to the restriction means 12 via its passage through the slits 13 harnesses the apparatus 1 to the animal 2.

As illustrated in FIGS. 1 and 2, the strap 14 is first extended from the anterior slits 13 of the rail 6 on one side of the animal 2 transversally toward the front and the outside.

Then it is turned up under the neck of the animal 2, reaching under the sternum its crossing point, from there being then oriented toward the rear and toward the outside of the opposite side.

Then the strap goes up again essentially in a transverse plane TH, toward the slits 13 of the rail 6 placed posterior to the first ones mentioned. These slits 13 that are placed posterior are situated behind the forelimbs of the animal 2. Here the strap 14 crosses the rail 6 via the slits 13 that are placed posterior, transversally from one side to the other, in a direction opposite to that of its preceding crossing under the sternum of the animal 2.

Then the strap 14 goes down symmetrically and from top to bottom behind the forelimb opposite to the first, and then is oriented toward the front up to the crossing point.

From this point, it goes up again in front of the forelimb opposite to the last mentioned from bottom to top, under the neck of the animal 2, to rejoin the first-mentioned slits 13 of the rail 6, on the side of it opposite to the first.

This particular path of the strap 14 provides the apparatus 1 with an exceptional fit and considerable comfort.

In the embodiment of FIG. 5, the anterior securing means 3 of the apparatus 1 that comprises a strap 14 has two ends connected by a rapid fixation 17. This fixation 17 ensures the closing of the means 3 and thus the fit on the animal 2 of the apparatus 1. This fixation 17 possesses here, on the one hand, a plurality of male connectors 18 that are elastically deformable and, on the other hand, a plurality of slots 19 of essentially complementary shape, into which the connectors 18 are able to fit after their elastic deformation.

An embodiment not shown provides, in place of such a fixation 17, a pair of rapid micro-gripper closures 20, respectively male and female, on at least two ends and/or parts of the strap 14, in order to ensure the fit of the apparatus 1. These closures may also make possible the fixation of medical devices.

In FIG. 5, the fixation 17 is located in the upper and posterior part of the strap 14 in proximity to the slits 13 placed posterior.

It is to be noted in FIG. 5 that the posterior means 4 for securing the apparatus 1 to the animal 2 comprise a circle 21. This circle 21 is designed to encompass the lumbar girdle of the animal 2.

In FIG. 5, this circle 21 is semi-rigid. More precisely, the lumbar circle 21 possesses a top part 22 made of rigid material such as metallic material or the like, extended over the upper two-thirds of this circle 21. In the lower third of the circle 21, this circle is composed of a bottom part 23 made of material allowing a slight elastic deformation and/or an opening-closing articulation of this circle 21. Here, the bottom part 23 is made of material allowing a slight elastic deformation, such as semi-flexible synthetic material.

The lumbar circle 21, not shown in this embodiment in the appended drawings, may also be included in synthetic-fabric breeches that are more-or-less covering.

Although in FIG. 5 the posterior securing means 4 comprise connectors 18 and slots 19 similar to those of strap 14, some embodiments provide a pair of micro-gripper closures 20, respectively male and female, on at least two ends and/or parts of this circle 21.

It is to be understood that the apparatus 1 of FIG. 5 is kept in position by the posterior semi-rigid lumbar circle 21 and anterior straps 14 that are crossed under the sternum. This apparatus 1 is thus placed at the level of the dorsal curve of the animal 2, in order to make possible the passage of the straps 14 as close as possible to its body.

Whereas by crossing the straps under the sternum of the animal 2, the stability of the apparatus 1 on this animal is particularly noteworthy.

It has been seen that on the dorsal extruded rail section 6 a plurality of slits 13 of longitudinal orientation is provided for. Here, the slits 13 of the male section 11 may be coincided with certain slits 13 of the female section 7. These slits 13 therefore have two principal functions: ensure maintenance in a chosen relative position
    of the male 11 and female 7 sections of the dorsal extruded rail section 6, and
    of this dorsal extruded rail section 6 with respect to the straps 14, and therefore to the animal.

In FIG. 5 a rigidifying apparatus 1 is shown that comprises elements, referred to as sections, of a single rail 6, that fit into each other in such a way as to be able to fit the size of each animal 2.

The means ensuring the lumbar closure are, according to the embodiments, realized either by catches arranged and shaped to be "imbedded" (i.e., engaged by elastic fastening or "clipped") in the perforations of the flexible part, or by micro-grippers.

The lumbar circle 21 of the embodiment of FIG. 5 presents a relatively wide structure (in its longitudinal direction L) in order to offer better comfort when the apparatus 1 is worn.

In an implementation not shown, this lumbar circle 21 is entirely a rigid structure, but provided with an opening-closing hinge, in the manner of a shackle.

Whereas in FIG. 5, this circle 21 is not rigid over its entire periphery: as a matter of fact, essentially a lower third, centered transversally, of this periphery is made of elastically deformable or flexible material.

Moreover, this third presents opening-closing means for the lumbar circle 21. These opening-closing means make possible the easy and rapid installation and removal of the apparatus 1 on and from the animal 2.

The apparatus 1 according to the invention, and illustrated in FIG. 3, comprises means of support or anchoring 15 of an external object. These means 15 make possible the anchoring here on the dorsal rail 6 of an external object such as a perfusion device, an instrument (for example, for measurement and/or detection and/or emission), or other. Thus fixed on the apparatus 1, the external object cannot be torn off by the animal, which guarantees the persistence of this object or of its functionality.

Although it may not be evident from the figures, an embodiment of the invention provides that at least a part of the apparatus 1 is made of phosphorescent material and/or is covered with a phosphorescent preparation. This makes it possible to better make the animal 2 visible in dark surroundings or in the dark, when it wears the apparatus 1 according to the invention. As a matter of fact, it is desirable for the animal 2 to avoid any unfortunate shock by signaling its presence, for example when it is in a thoroughfare.

Figure 6:
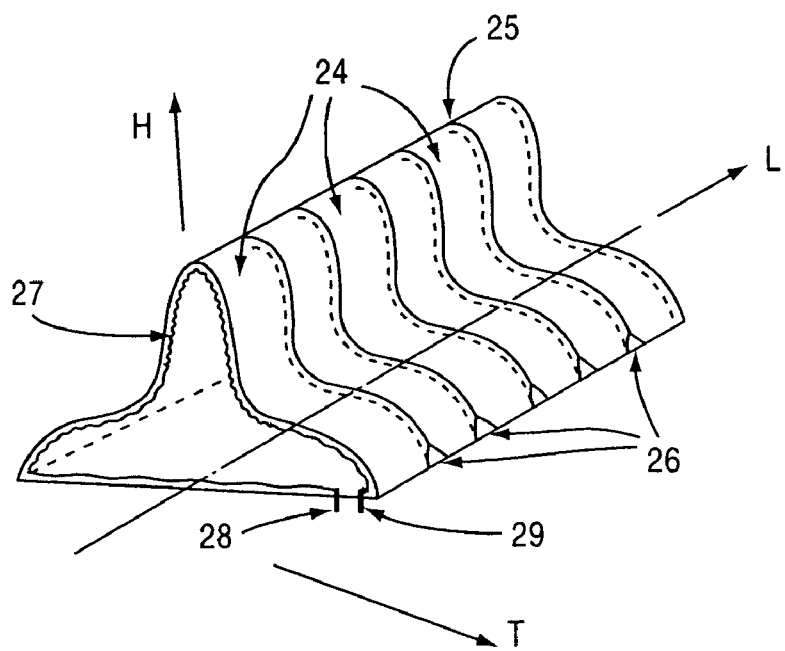
FIG. 6 shows the device according to the invention equipped with alarm means.

In the same way, the dorsal rail (6) as shown in FIG. 6 may be equipped at front with at least two detachable antennae (30), equipped with an acoustic alarm (31) such as small bells. This means makes it possible for a blind animal to avoid banging its head against an obstacle and functions as a blind man's cane.

Figure 7:
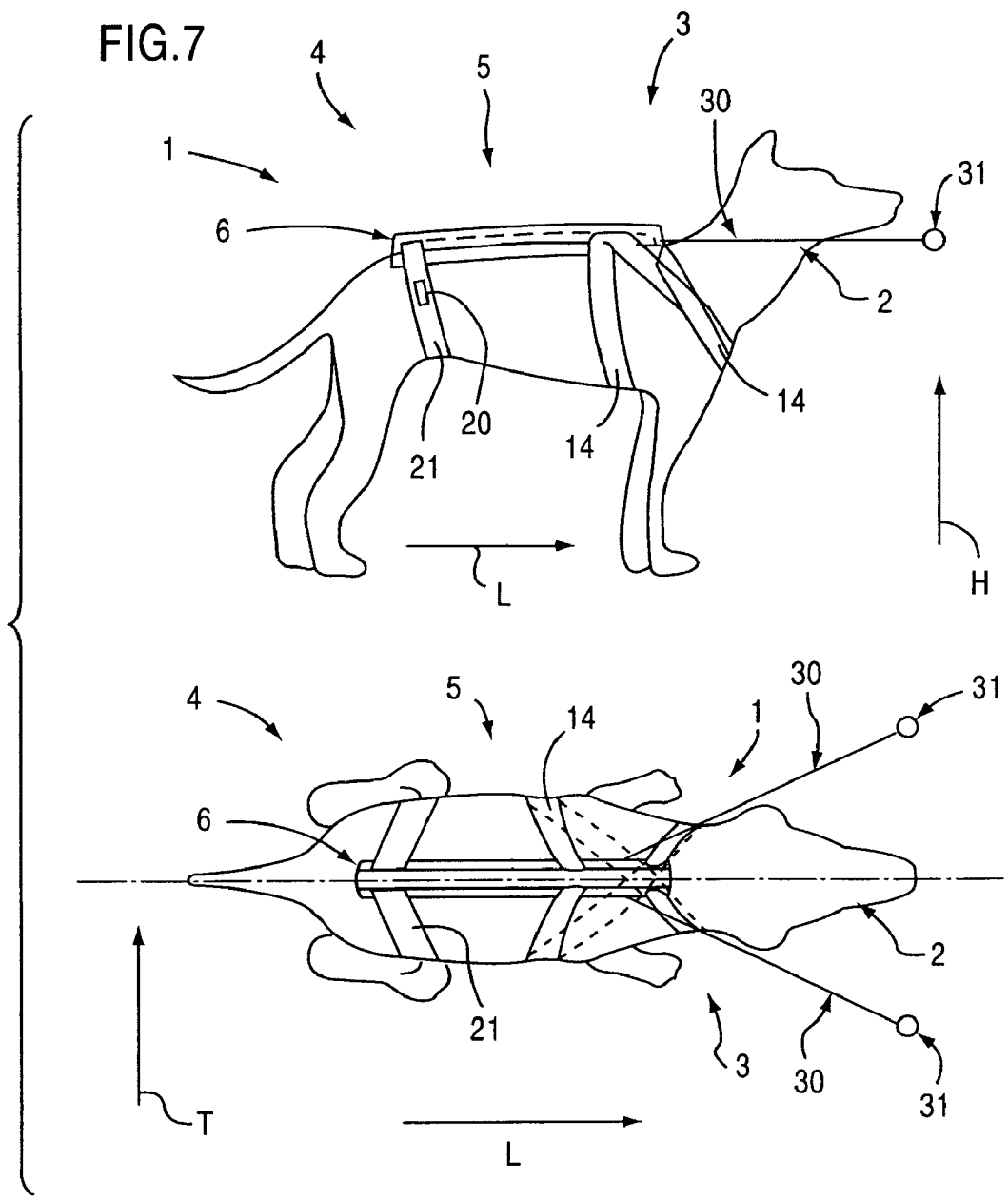
FIG. 7 is a partial schematic perspective transverse view from above that illustrates another embodiment of the apparatus according to the invention.
Figure 8:
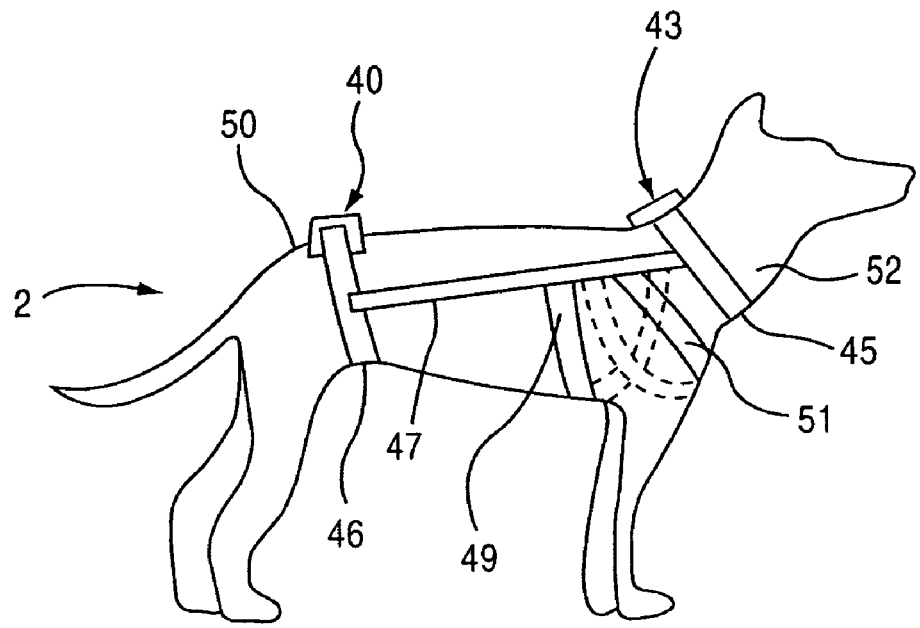
FIG. 8 is a longitudinal view of an animal such as a dog, on a reduced scale, equipped with an apparatus according to another embodiment of the invention.

It is to be noted finally that in FIG. 7, the rail 6 comprises separable sections (24) delimited by peripheral sectioning lines (26); each separable section (24) encloses, in proximity to each sectioning line (25), an embedded resistive conductor (27) allowing two electrodes (28–29) to emerge.

In this variant, the rail (6) may be made of a single element, the practitioner being in a position to very easily and very rapidly adjust the length of the device to the size of the animal. It is sufficient to remove one or several separable sections. In order to do this, the practitioner passes a suitable electric current through the electrodes (28–29), said current leading to a release of temperature at right angles to each separable section, which then makes possible an easy release of one or several sections at right angles to each pre-fracture (26).

Another improved embodiment of the apparatus according to the invention will now be described, illustrated in FIGS. 8 to 11.

In the first place, as in preceding apparatuses, the apparatus 44 of FIGS. 8 to 11 comprises anterior and posterior means for securing to the animal 2, and movement restriction means, integral or connected to said securing means.

In this apparatus 44, the dorsal rail 6 of the preceding embodiments is replaced by means for restricting of the movement of the animal 2 comprising at least a dorsal bolster 40 or 43 designed to be placed at right angles to the sagittal symmetry plane LH of the animal 2, resting on its cervical vertebrae and possibly in proximity to the last lumbar vertebra 50.

This bolster 40 or 43 is formed in a manner similar to those illustrated in FIGS. 3, 4 and 6, by a section with closed or open transverse cross-section defining at least a longitudinal section, with a central arch 41 projecting upward and two lateral wings 42. These wings 42 are curved toward the bottom and essentially symmetrical to each other with respect to the median longitudinal plane defined by the arch 41, which has a concavity turned toward the bottom.

In a preferred embodiment, the apparatus 44 comprises:
  two bolsters or stirrup pieces, the one 40 forming a male extruded section designed to be placed resting on the posterior part or last lumbar vertebra 50 of the animal 2, the other 43 forming a female extruded section designed to be positioned on the base of the neck 52, i.e. on the cervical vertebrae of the animal,
  two circular loops 45 and 46 integral with the respective bolsters or stirrup pieces 43 and 40; these loops are dimensioned to encircle, the anterior one 45, the base of the neck 52 of the animal 2, and the other, posterior, one 46, the last lumbar vertebra 50, constituting a lumbar circle 46;
  two rigid longitudinal bars 47 and 48 positioned laterally on each side of the sagittal symmetry plane LH, at an appropriate height on the flanks of the animal 2; the ends of the bars 47, 48 are connected to the anterior 45 and lumbar 46 loops or circles of the neck and the posterior 50 by appropriate adjustable fixations, of known types;
  a device with two straps 49 and 51 completes the apparatus 44 and is arranged to encircle the sternum of the animal 2, the ends of the straps 49, 51 being fixed in an adjustable way to the rigid bars 47, 48.

Figure 9:
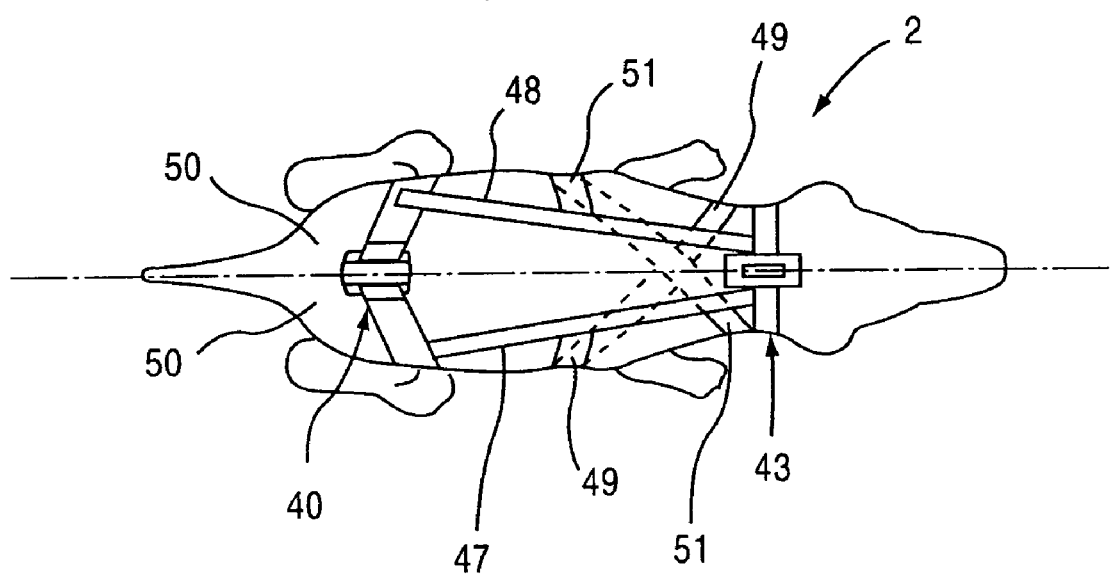
FIG. 9 is a view from above of the animal and of the apparatus according to the invention, corresponding to FIG. 8.
Figure 11:
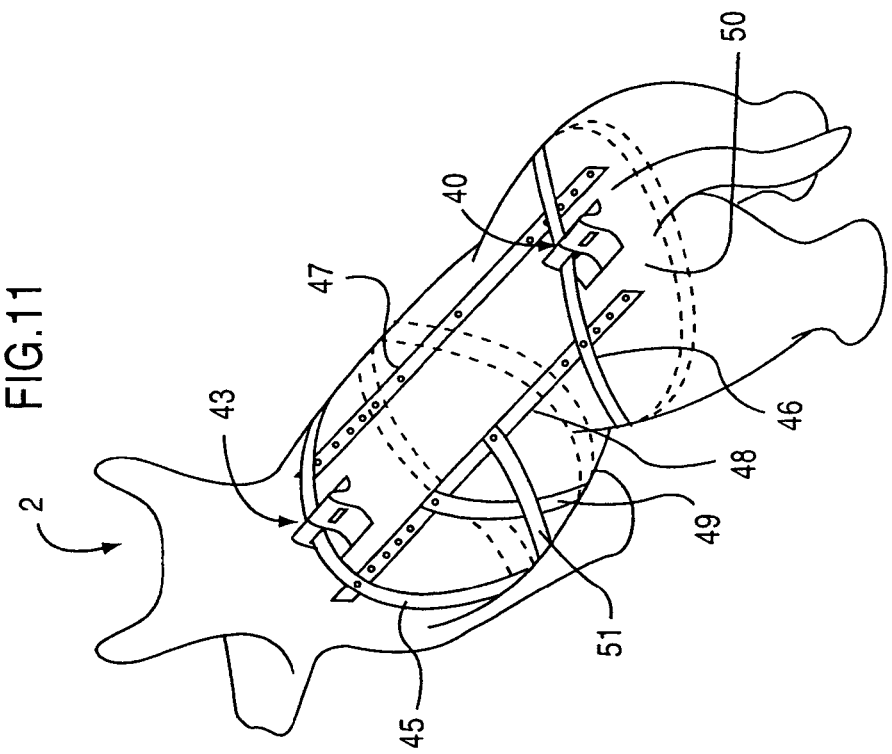
FIG. 11 is a perspective view, on a reduced scale with respect to FIG. 10, of the apparatus according to this embodiment of the invention, arranged on the back of an animal such as a dog.
Figure 10:
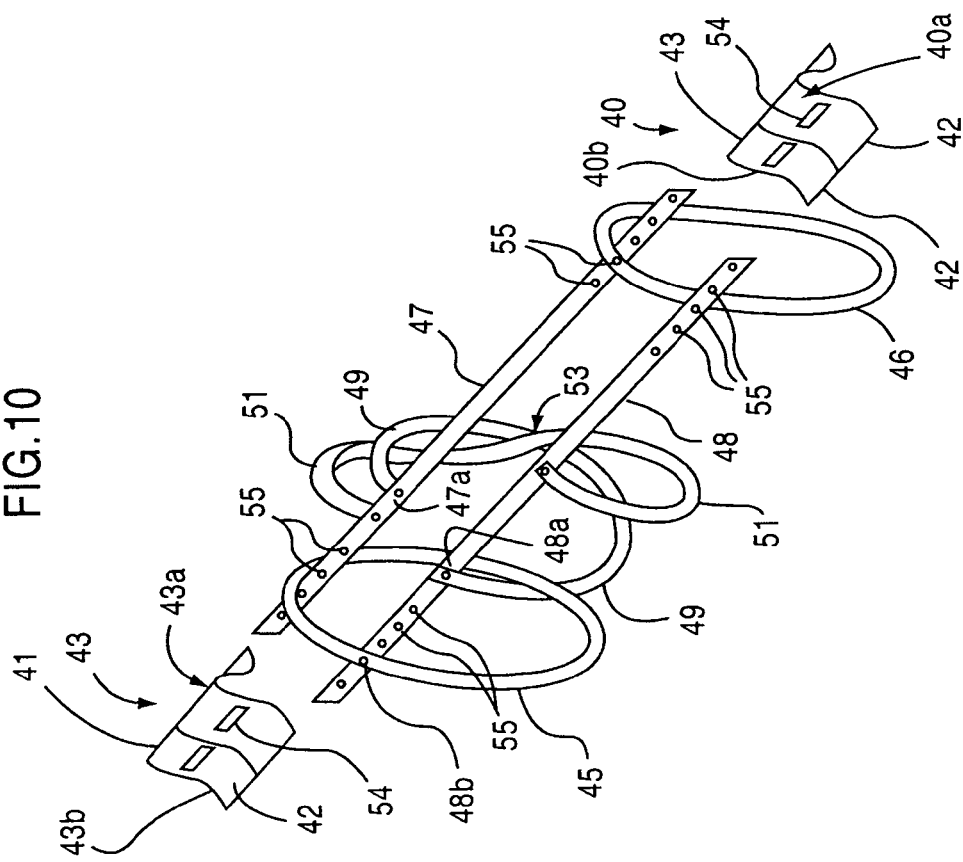
FIG. 10 is an exploded perspective view of the apparatus of FIGS. 8 and 9.

The first strap 49 is fixed by an end to an appropriate place 47a of a bar 47, and encircles the thorax of the animal 2 while its other end is fixed to the second bar 48 at a point 48a (FIGS. 9 and 10) closer to the anterior circle 45 than the fixation point 47a, that is to say possibly to the junction 48b of the bar 48 and of said anterior circle or loop 45. The second strap 51 may be arranged in a way essentially symmetrical to the first 49 with respect to the sagittal symmetry plane LH of the animal 2: thus the strap 51 is connected through its ends to the two rigid bars 47, 48 by crossing over the first strap 49 on the sternum of the animal (FIGS. 9 and 11). The second strap 51 can possibly have an end fixed to the junction between the anterior loop 45 and one of the rigid bars 47, 48.

These fixations are obtained by known adjustable means not shown in FIGS. 8 to 11.

Slits 54 are arranged longitudinally in the bolsters or stirrup pieces 40, 43 so that the respective loops or circles 46, 45 they can be passed through as well as can the latter by: the anterior circle 45 inserted into a slit 54 emerging from each side of the base of the central arch 41, crosses the central arch 41 while resting on the lateral wings 42, and in the same way the lumbar circle 46 crosses the base of the central arch 41 of the bolster or stirrup piece 40 while resting on the wings 42.

To the best advantage, each bolster or stirrup piece 40, 43 can be formed from at least two separable sections (40a, 40b, 43a, 43b) delimited by peripheral sectioning lines, and in each of which is contrived a transverse slit 54. The arrangement of the bolsters 40, 43 is similar to that described with reference to FIGS. 3 to 5, the slits being spaced out longitudinally in order to make possible an adjustment of the longitudinal position of the loops 45, 46. These bolsters may be made of deformable material molded directly on the neck or possibly the lumbar circle of the animal.

The length of the apparatus 44 may be adjusted by fitting the front 45 and rear 46 circles or loops to the rigid bars 47, 48.

To this end the rigid bars 47, 48 may be telescopic, or pierced by holes 55 (FIG. 10) spaced out at appropriate intervals from their ends, into which rivets (not shown), made of plastic or other material, arranged on the front 45 and rear 46 loops, may be introduced.

The length of the joint makes it possible to increase or decrease the length of the rigidification device 47, 48, and therefore to adjust it perfectly to the morphology of the animal.

The two straps 49, 51 crossed on the sternum of the animal 2 and fixed to the rigidification bars 47, 48, combined with the latter, averts any risk of the shoulders of the animal coming out, by rotation, from the anterior part of the apparatus 44. The apparatus according to the invention can thus advantageously replace a previous known apparatus (FR-A 2 769 796), comprising a collar linked to a stiffening axle that is itself of one piece with a belt forming a lumbar circle. The implementation of this previous system has shown that it does not prevent a possibility of torsion and rotation of the device, which was then no longer able to appropriately fulfill its function.

Within the scope of the invention, the movement restriction apparatus is capable of various modifications, while comprising anterior and posterior means for securing the apparatus to the animal that are integral or connected to movement restriction means.

Thus in an embodiment simplified with respect to those described previously and which is not shown, the apparatus is devoid of a stiffening dorsal rail and of a front or rear bolster: the movement restriction means comprise a front loop or belt such as loop 45, fitted to encircle the base of the neck 52 of the animal, a rear loop or lumbar belt such as 46, fitted to encircle the last lumbar vertebra 50 of the animal, two rigid longitudinal stiffening bars such as 47 and 48 positioned laterally on each side of the sagittal symmetry plane LH of the animal, the ends of which are connected in an adjustable manner to the loops or belts of the neck and posterior of the animal, and finally a strapping device such as 49 and 51 arranged to encircle the sternum (thorax) of the animal while crossing each other there, at least two ends of these straps being fixed in an adjustable manner to said rigid stiffening bars.

At least the front loop or belt is then made of a semi-rigid material in order to make up for the absence of the dorsal rail and the bolster. Adjustable means for securing the ends of the stiffening bars are provided, for example rapid fixations by means of holes spaced at intervals in the bars and corresponding rivets equipping the front and rear loops or conversely, systems of snaps, etc., of known types that need no detailed description.

Figure 12:
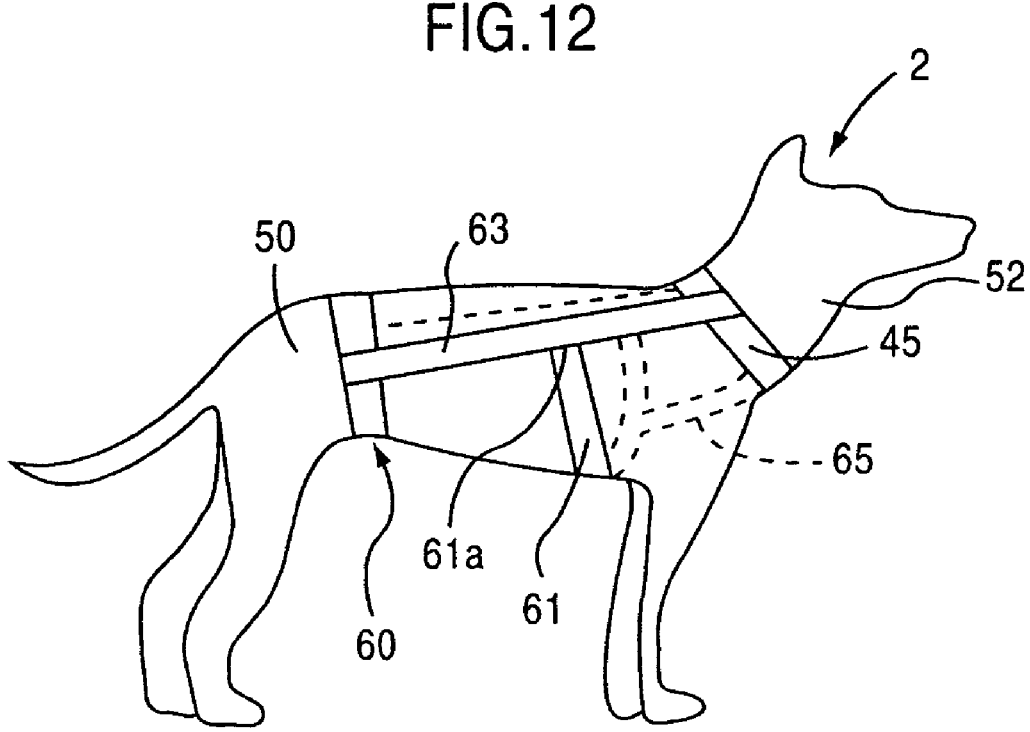
FIGS. 12 and 13 are views from the side and from above analogous to FIGS. 8 and 9, illustrating another embodiment of the apparatus of FIGS. 8 to 11.
Figure 13:
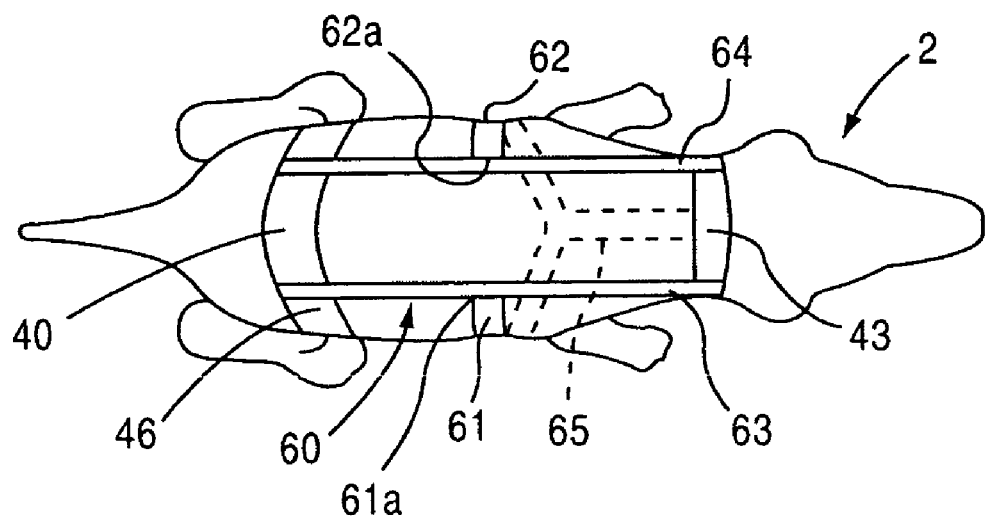

In a variant of this last embodiment, not shown, the strapping device is similar to that illustrated in FIGS. 12 and 13: it comprises two straps such as 61 and 62, the two ends of which are fixed to the respective rigid bars from which they can envelop the sternum of the animal; these two straps meet under the animal essentially in its sagittal symmetry plane LH, and extend by a thin strap such as 65, forming a T. The thin strap 65 extends to the front loop 45, to which it may be fixed in an adjustable manner, this third strap or thin strap 65 extending between the forepaws of the animal.

With these apparatuses according to the invention the animal can no longer move its head except up and down. It can therefore, in particular, feed itself, but any torsion or rotation in a lateral direction is prevented, in such a way that it can no longer in any case reach with its mouth a zone of its body that is to be protected.

What is claimed is:

1. Movement restriction apparatus designed to prevent an animal from reaching with its mouth or some of its limbs, a zone of its body to be protected; this apparatus being of the type comprising: anterior means for securing the apparatus to the animal; posterior means for securing the apparatus to the animal; movement restriction means; the anterior and posterior securing means being integral or connected to the movement restriction means;

wherein the movement restriction means comprise a dorsal rail designed to be placed at right angles to the sagittal symmetry plane of the animal, against the crest of a part of its vertebral column; this rail being in the form of a section with a closed or open transverse cross-section, and the dorsal rail comprises at least one longitudinal section comprising (i) a central arch having a concavity turned toward the bottom forming a continuously projecting groove of rigidity extending longitudinally, from the anterior securing means to the posterior securing means, and (ii) two falling wings, essentially symmetrically from top to bottom and from the inside to the outside; wherein said wings are integral with the dorsal rail and extend along the complete longitudinal length of the dorsal rail, wherein the anterior means for securing the apparatus to the animal comprises at least one strap designed to be crossed under the sternum of the animal, and wherein the posterior means comprises a posterior lumbar circle, wherein the posterior lumbar circle is at least in part made of a material allowing a slight deformation, wherein at least an upper third to two-thirds of this circle is made of a rigid material, and at least a lower third to two-thirds comprises a material allowing a slight elastic deformation.

2. Apparatus according to claim 1, wherein the central arch forms a projecting groove of rigidity, ventilation and comfort, while the two wings form lateral support zones on the back of the animal.

3. Apparatus according to claim 2, wherein the lateral wings and/or the central arch are at least in part covered on the inside with a soft comfort covering.

4. Apparatus according to claim 3, wherein the soft comfort covering is a cushion of washable hypoallergenic foam.

5. Apparatus according to claim 1, wherein the dorsal rail of the restriction means is made of plastic, or of metallic material.

6. Apparatus according to claim 5, wherein the restriction means is made of plastic-by injection, or of metallic material-by rolling of flat rolled metal.

7. Apparatus according to claim 1, wherein the dorsal rail comprises a series of separable sections delimited by peripheral sectioning lines accompanied by lower pre-fractures, and in that each section encloses, in proximity to each sectioning line, an embedded resistive conductor from which two electrodes emerge.

8. Apparatus according to claim 1, wherein the dorsal rail comprises at least a fixation means or at least two orifices transversally opposite to each other, and which are part of means for support on the apparatus of at least a device for treatment and/or an electronic device.

9. Apparatus according to claim 8, wherein the device for treatment is a perfusion device and the electronic device is for measurement.

10. Apparatus according to claim 1, wherein the longitudinal section of the dorsal rail is phosphorescent and each of its surfaces serves as a support for advertising material carried by the animal.

11. Apparatus according to claim 1, wherein the dorsal rail is provided at its front portion with at least two detachable antennae equipped with an acoustic alarm, arranged on both sides of the animal's head.

12. Apparatus according to claim 1, wherein the anterior means for securing, the posterior means for securing, or both the anterior and posterior means for securing the apparatus to the animal each respectively comprise at least one strap, at least two ends and/or parts of which are joined by a rapid fixation equipped with at least an elastically deformable connector able to fit into a slot of essentially complementary shape after elastic deformation.

13. Apparatus according to claim 1, wherein the posterior lumbar circle is designed to enclose the lumbar girdle of the animal.

14. Apparatus according to claim 13, wherein the lumbar circle is include in synthetic-fabric breeches.

15. Apparatus according to claim 13, wherein the posterior circle is semi-rigid.

16. Apparatus according to claim 1, wherein the anterior means for securing, the posterior means for securing, or both the anterior and posterior means for securing the apparatus to the animal each respectively comprise at least one pair of micro-gripper closures, respectively male and female, on at least two ends and/or parts, which can also make possible the fixation of medical devices.

17. Apparatus according to claim 1, wherein the arch and the two wings are integral with each other.

18. Apparatus according to claim 1, wherein the arch and the two wings of the rail have approximately the same length.

19. Apparatus according to claim 1, wherein the arch and the two wings of the rail are made of one piece.

20. Apparatus according to claim 1, wherein the dorsal rail is an extruded piece.

21. Apparatus according to claim 1, wherein the material allowing a slight elastic deformation is a semi-flexible synthetic material.

22. Apparatus according to claim 1, wherein the strap is connected to the restriction means via its passage through at least a slit of binding means between the securing means and the restriction means.

23. Apparatus for movement restriction according to claim 1 designed to prevent an animal from reaching with its mouth or some of its limbs a zone of its body to be protected, this apparatus being of the type comprising anterior means for securing the apparatus to the animal, posterior means for securing the apparatus to the animal, movement restriction means, the anterior and posterior securing means being integral or connected to the movement restriction means,
  wherein the movement restriction means comprise a front loop adapted to encircle the base of the neck of the animal, a rear loop fitted to encircle the posterior of the animal, two rigid longitudinal stiffening bars, positioned laterally on each side of the sagittal symmetry plane of the animal and the ends of which are connected to the front and rear loops,
  and wherein at least one of the front loop and the rear loop comprises a bolster made of deformable material and moldable directly on the neck of the animal or on its lumbar circle.

24. Apparatus according to claim 23, wherein at least a part of the front loop and the rear loop is made of a semi-rigid material.

25. Apparatus according to claim 23, comprising adjustable means for securing the loops to the rigid bars.

26. Apparatus according to claim 25, wherein the adjustable securing means comprises rapid fixations through holes spaced at intervals in the bars and corresponding rivets on the loops or conversely.

27. Apparatus according to claim 23, comprising a strapping device arranged to encircle the sternum of the animal and to cross at this point, and at least two ends of which are fixed in an adjustable manner to the rigid lateral bars.

28. Apparatus according to claim 23, wherein the bars are telescopic.

29. Movement restriction apparatus designed to prevent an animal from reaching with its mouth or some of its limbs, a zone of its body to be protected; this apparatus being of the type comprising: anterior means for securing the apparatus to the animal; posterior means for securing the apparatus to the animal; movement restriction means; the anterior and posterior securing means being integral or connected to the movement restriction means;
  wherein the movement restriction means comprise a dorsal rail designed to be placed at right angles to the sagittal symmetry plane of the animal, against the crest of a part of its vertebral column; this rail being in the form of a section with a closed or open transverse cross-section, and the dorsal rail comprises at least one longitudinal section comprising (i) a central arch having a concavity turned toward the bottom forming a projecting groove of rigidity extending longitudinally, and (ii) two falling wings, essentially symmetrically from top to bottom and from the inside to the outside, and
  wherein the dorsal rail comprises at least two sections, one male and the other female with general transverse cross-section in the shape of an omega or a Gaussian curve, fitted into each other by a longitudinal sliding motion, and relative immobilization means of the two sections, in order to form telescopic longitudinal adjustment means of the apparatus.

30. Apparatus according to claim 29, wherein the dorsal rail comprises at least two slits transversally opposite to each other, and of generally essentially longitudinal orientation, these slits being part of binding means between the securing means and the restriction means and/or of the relative immobilization means of the two adjustable telescopic sections in the longitudinal direction of the apparatus.

31. Apparatus for movement restriction designed to prevent an animal from reaching with its mouth or some of its limbs a zone of its body to be protected, of the type comprising anterior and posterior means for securing the apparatus to the animal, movement restriction means, the anterior and posterior securing means being integral or connected to the movement restriction means,
  wherein the movement restriction means comprise at least two dorsal bolsters designed to be placed at right angles to a sagittal symmetry plane of the animal, resting respectively on its cervical vertebrae and in proximity to its last lumbar vertebrae, these bolsters are each formed of a section with closed or open transverse cross-section, defining at least a longitudinal section comprising (i) a central arch with a concavity turned toward the bottom forming a projecting groove of rigidity extending longitudinally, and (ii) two falling lateral wings essentially symmetrically with respect to the central arch, and
  wherein said apparatus comprises a loop secured to each respective bolster and dimensioned to encircle, one the base of the neck of the animal and the other the posterior of the animal, two rigid longitudinal bars designed to be positioned laterally on the flanks of the animal on each side of the sagittal symmetry plane and the ends of which are connected to the loops of the neck and posterior of the animal.

32. Apparatus according to claim 31, wherein a strapping device comprises at least two straps arranged to encircle the sternum of the animal and to cross at this point, one of the two straps is fixed by an end to an appropriate place on one of the two longitudinal bars and encircles the thorax of the animal, while its other end is fixed to the second longitudinal bar in proximity to the anterior loop, and the second strap is connected by its ends to the two longitudinal bars essentially symmetrically to the first strap.

33. Apparatus according to claim 32, wherein slits are arranged in the bolsters so that they can be passed through by the respective loops, and are spaced at longitudinal intervals in order to make possible an adjustment of the position of the loops.

34. Apparatus according to claim 31, wherein at least one of the bolsters is formed from at least two separable sections delimited by peripheral sectioning lines.

35. Apparatus according to claim 31, wherein at least one of the two bolsters is made of deformable material and is molded directly on a part of the animal selected from its neck and its lumbar circle.

36. Apparatus according to claim 31, wherein the movement restriction means has at least a piece made of rigid material.

37. Apparatus according to claim 31, comprising a strapping device arranged to encircle the sternum of the animal and to cross at this point, and at least two ends of which are fixed in an adjustable manner to the rigid lateral bars.

* * * * *